Patented Dec. 20, 1949

2,491,468

UNITED STATES PATENT OFFICE 2,491,468

LIME TREATED SABADILLA SEED INSECTICIDE

Thomas C. Allen, Madison, Wis., assignor to Wisconsin Alumni Research Foundation, Madison, Wis., a corporation of Wisconsin No Drawing. Application March 2, 1945,
Serial No. 580,726

4 Claims. (Cl. 167—24)

This invention relates to an insecticide and the method of preparing same. It has special reference to the Sabadilla plant and particularly the seed thereof as a source of material toxic to insects.

One of the objects of my invention is to provide an insecticide which is highly toxic to insects and which is more effective and less expensive to produce than the present forms of commercial insecticides.

A further object is to convert Sabadilla seed, which in its normal or natural state is either non-toxic or insufficiently toxic, into a highly toxic product for use as the toxic ingredient of an insecticide for insects.

The Sabadilla seed of commerce is principally derived from plants of the Schoenocaulon genus, Tribe, Verateae, Family Lilliaceae, of which over thirteen species have been described. Of these species, the Schoenocaulon officinale (Schlect. and Cham.) A. Gray. is the principal source of commercial Sabadilla seed. The Schoenocaulon officinale has been collected in Mexico, Guatemala, Honduras and Venezuela, while another species Schoenocaulon drumondii, A. Gray. is prevalent in the United States, and has been found by me to be most satisfactory in possessing the active principle which is toxic to insects.

While other portions of the plant, such as the spikes, have been found to be toxic to some degree, it is not sufficient to provide a commercial source, and my work has shown that the seed of the plant is the principal source of active ingredients.

I have also found that the toxicity of the Sabadilla seed in the natural state of different species varies greatly, some being practically non-toxic and others being in some instances somewhat toxic, but in no case sufficient to meet the requirement of the standards generally recognized for commercial insecticides. This wide range of variation exists also in the seed of the same species. These differences are presumably due to such factors as age and storage of the seed and methods of harvest, and possibly environmental conditions associated with the wide floral range of the plant.

I have discovered that the mixing and intimate associating of hydrated lime (calcium hydroxide) with the Sabadilla seed, increases or renders active to a high degree the potency of the toxic ingredients of the seed irrespective of the degree of the toxicity of the seed before treatment. As a result, the seed of the various species and of various batches of the same species can be brought up to a substantially uniform level of toxicity, higher than the degree of toxicity found in any of the species in the normal or natural state. This is extremely important from a commercial standpoint, because it enables the insecticide producers to utilize all of the available Sabadilla seed without regard to the natural toxic properties and without the necessity of pre-testing or selecting toxic species. Furthermore, this high level of toxicity provides a product which is effective to meet and surpass the degree of toxicity required for commercial insecticides.

In carrying out the invention, the seed and lime in powder form are mixed together, both in dry condition, so that the particles of powdered seed become coated with lime, and this mixing is best accomplished by grinding or pulverizing the seed and lime together in a suitable mill for the purpose. This method assures a more complete distribution of the materials and a more intimate association of the lime and Sabadilla seed particles. However, if desired, the seed can be ground or pulverized separately and then mixed with powdered lime by stirring or agitating until a thorough mixture is attained.

In the commercial manufacture of insecticides it is desirable to produce a concentrate which is afterwards diluted for use. To this end, sufficient lime is added to the powdered seed to effect the potency of the seed; and while the degree of enhancement of the toxicity of the seed apparently is in proportion to the quantity of lime relatively to the quantity of seed, I find that maximum toxicity is imparted or developed in the seed by mixing equal parts by volume of powdered seed and lime, as for instance 50 parts of powdered seed and 50 parts of powdered lime. This concentrate can then be prepared for use as a dry dusting powder or as liquid for application by spraying.

If a dusting powder insecticide is desired, the concentrate can be mixed with any of the usual dispersing agents or vehicles such as talc which is the most common. Likewise, if a spray insecticide is desired, the concentrate is mixed in solution or suspension with a suitable liquid dispersing agent such as kerosene or water.

From the commercial standpoint, the making of a concentrate mixture to be diluted for use as desired is the most advantageous; the final product can be made directly by grinding the seed, lime and diluent together in one operation.

The best results are obtained in the killing of insects by using a mixture of ¾ of 1% to 20% of treated Sabadilla seed to 99¼% to 80% diluent or dispersing agent, depending upon the susceptibility of the insect to which the material is applied.

I have carried out extensive tests of treated and untreated Sabadilla seed on milkweed bugs, squash bugs, cabbage worms, cabbage looper, and several species of grasshoppers, leaf hoppers and lygus bugs, and have found that in general the lime treated Sabadilla seed applied as a dusting insecticide gives from 75% to 100% kill as compared with not over 25% kill with untreated seed.

I claim:

1. An insecticide in which the active ingredients are powdered Sabadilla seed and hydrated lime.

2. An insecticide comprising a mixture of a filler, powdered Sabadilla seed and hydrated lime, said seed and lime being the active ingredients.

3. An insecticide comprising a mixture of powdered Sabadilla seed and hydrated lime, and a dispersing agent.

4. An insecticide adapted to be applied as a dusting powder comprising a mixture of 50 parts of dry powdered Sabadilla seed and 50 parts hydrated lime, and a dry powdered dispersing agent, said mixture being mixed with said dispersing agent in the proportion of ¾ of 1% to 20% mixture and 99¼% to 80% dispersing agent.

THOMAS C. ALLEN.

REFERENCES CITED

The following references are of record in the file of this patent:

UNITED STATES PATENTS

| Number | Name | Date |
|---|---|---|
| 2,024,392 | Schotte et al. | Dec. 17, 1935 |
| 2,092,308 | Gnadinger | Sept. 7, 1937 |
| 2,423,284 | Babbini | July 1, 1947 |

OTHER REFERENCES

J. Econ. Ent. 1944, pages 400–408, by Allen et al. (Copy in Patent Office Library.)